April 17, 1956 M. G. RYON ET AL 2,742,533

WEDGE LOCK TO MULTIPLE

Filed May 15, 1951 2 Sheets-Sheet 1

INVENTORS
Maurice G. Ryon
BY Donald S. Baker,
Brown, Jackson, Boettcher & Dienner
Attys.

WEDGE LOCK TO MULTIPLE

Filed May 15, 1951 2 Sheets-Sheet 2

INVENTORS.
Maurice G. Ryon
BY Donald S. Baker,
Brown, Jackson, Boettcher & Dienner
Attys.

United States Patent Office 2,742,533

Patented Apr. 17, 1956

2,742,533

WEDGE LOCK TO MULTIPLE

Maurice G. Ryon, Galion, and Donald S. Baker, Kenton, Ohio, assignors to North Electric Company, Galion, Ohio, a corporation of Ohio Application May 15, 1951, Serial No. 226,374

15 Claims. (Cl. 179—27.54)

This invention relates in general to telephone apparatus and in particular to novel circuit connecting means for use in an all relay type automatic telephone exchange.

The superior operating features of all relay type telephone systems has long been known and achnowledged in the art, these features including the easy non-destructive movements of the relay units in their operation, the simplicity of the overall structural and circuit arrangement, the minimum amount of service problems encountered in the field, and the improved subscriber service which is provided with the use thereof. All relay equipment in a telephone exchange signifies a reduced amount of maintenance and simplified service problems for the maintenance man, reduced overall operating costs for the operating companies and improved service for the exchange subscriber.

Although these and many other features are inherent in any all-relay type system, it has been found that in the use thereof in larger size exchanges (1000 lines and more) the amount of required equipment increases rapidly, and the initial cost of the equipment frequently places the all-relay type systems at a competitive disadvantage with those of a more mechanical type. Further, the all relay systems heretofore known in the art were not especially flexible and were correspondingly not well adapted for any degree of expansion, and as a result, the all relay type systems have heretofore been more or less limited in their application to exchanges of a thousand or less subscriber lines.

With reference to the copending application Serial No. 226,371, which was filed May 15, 1951, by Blackhall et al. and which was assigned to the assignee of this invention, there has been set forth thereat a new and novel all-relay type arrangement which is particularly adapted to eliminate the described cost-size differential, and the inflexibility of all-relay systems known heretofore in the art.

The new and novel all-relay arrangement disclosed in such applications have succeeded in retaining the original inherent advantages of the all-relay system while additionally achieving a basic structure which is competitive in cost for use in all sizes of exchanges, is equal in convenience of operation, and is superior in its performance to the systems now in the field.

As in previous all relay type equipment, the exchanges are comprised of a series of individual banks or bays adapted to serve one hundred subscriber lines, the number of lines to be served by the exchange being indicative of the number of banks or bays of equipment which are required. The switching equipment in the bays is made up entirely of relay units, the units being mounted on strip members, each of which is readily and quickly detachable from the supporting bay frame as desired. The provision of the detachable equipment in the telephone exchange permits ready expansion of the exchange in growing areas as required and permits ready distribution of the equipment to meet changing traffic conditions as the exchange encounters these problems. Further, the provision of a demountable bay exchange is a definite asset to the installation and field maintenance man, the major portion of the installation being performed at the factory by the experienced factory personnel. The final installation in the field is thereby limited to placing of the individual strips into place, the soldering of the switchboard line cable to the main distributing frame, and a few other minor soldering operations.

As pointed out clearly in the aforedescribed copending applications, the provision of the demountable strip units in the telephone bay equipment is partially dependent upon the provision of extremely precise, accurate and reliable circuit connecting units which are capable of establishing the rapid interruption of a large number of multiple circuit connections which extend from the relays on each strip to interconnect with other equipment in the exchange.

The provision of connecting means for effecting circuit interruption of even a few contacts has resulted in the exploration of (and the resultant development of) a large number of types of connecting equipment in the past. However, the many connecting units developed as a result of these many probings, have failed to provide units which are the answer to the specialized problems which exist in the telephony art. For example, in the telephony field, the removal of a relay strip member entails the interruption of as many as one hundred circuit making and interrupting contacts in a single expeditious operation, the space allotted for jack means being practically limited to the space normally occupied by a single conventional relay unit. The connecting problem is further complicated by the extremely small area of contact which various members are allotted in an exchange, for in the establishment of a connection between small area contact members even the slightest degree of latitude in movement, or the presence of even the smallest amount of foreign material, will interfere with the links extended thereover. This problem is particularly well exemplified by the connections which must be effected in an all relay exchange between the rearwardly extending wire reeds of the line finder and connector relay units and the horizontal bare wire multiples which are arranged to interconnect the terminals of the groups of line finder and connector relay units. Such connections are specifically illustrated in Figure 11 of the McBerty Patent 2,415,437, which issued February 11, 1947.

As there shown, the tens relays of the adjacent line finder and connector switches are interconnected by a plurality of laterally disposed bare wire multiples which are fixedly supported at very definite, brief intervals by vertical plastic mounts, and are additionally soldered or welded to the relay wire terminals to insure positive contact between the members and to minimize any possible interruption of the connections therebetween which may result from possible flexing of the horizontal members by reason of their extreme length, changes in atmospheric conditions, etc.

It is apparent therefrom that the provision of connector means which are readily demountable and which permit the ready and rapid disconnection of the projecting wire terminals of the relays from the horizontal bare wire multiples of an exchange, and which are further operative to provide positive contact between each of the multiple members upon reassembly, is one of the difficult basic problems which must be solved in the accomplishment of a demountable type exchange, and it is a principal object of the invention to provide connector means whcih are capable of accomplishing this operation.

A specific feature of the invention is the comparatively simple structure of the novel connecting means and the flexible nature thereof, which lends such structure to ready and rapid use in effecting the connection and disconnection of the contacting members.

A further feature of the invention is the manner in which a wedge lock principle is utilized in effecting the connection of each terminal to its associated bare wire multiple, and the manner in which the connection is maintained under continued pressure for the period of engagement of the connecting means with the members to be connected.

For a more complete understanding of the nature and scope of my invention, reference may be held to the following detailed description taken in connection with the accompanying drawings in which.

The connecting means of the invention basically comprise two slidable Bakelite wire guides which are mounted on the horizontal bare wire multiples and which when moved into place provide, by wedge action, a high pressure contact between assigned relay reed terminals and corresponding bare wire multiples. As will become apparent hereinafter, the connecting operation comprises a primary or wedging action which brings the relay terminals into firm contact with the bare wire multiples, and a secondary or locking action which thereafter maintains the connection between the relay terminals and bare wire multiples, a live pressure being effected which is in the order of 100 tons per square inch.

Figures 1, 2, 3:
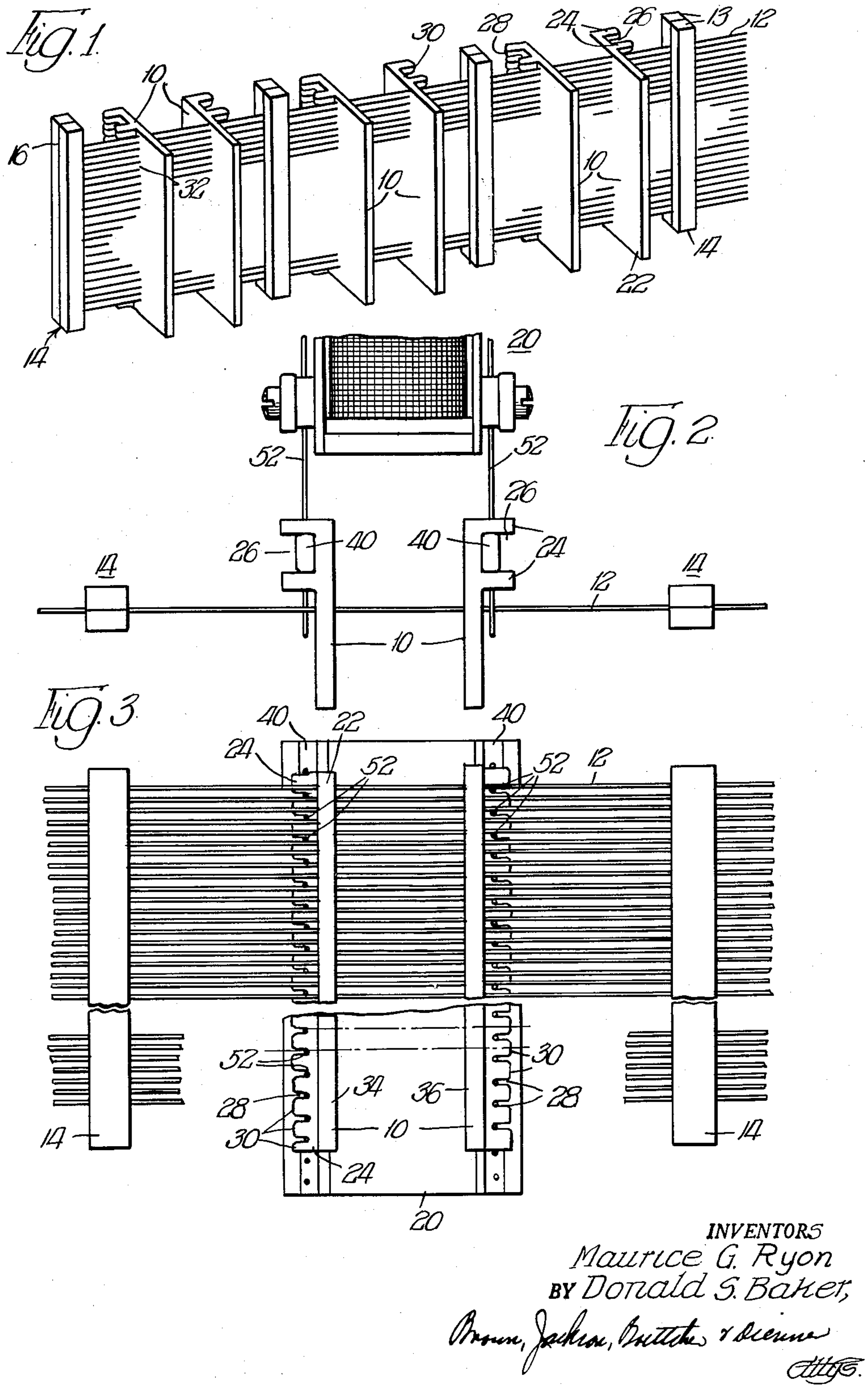
Figure 1 is a perspective view of a bay exchange illustrating somewhat diagrammatically the manner in which a series of wire clamp guides are connected to the bare wire multiples of an exchange for interconnecting the terminals of associated relays therein.
Figure 2 is a top plan view illustrating one pair of slidable bare wire clamping guides and their manner of connection with the terminal moldings of a strip mounted relay.
Figure 3 is a partial end plan view of the structure in Figure 2.

Referring now particularly to Figure 1 of the drawings, there is shown thereat a plurality of the pairs of novel slidable wire clamping guides 10 as mounted on the bare wire multiples 12 which extend between the terminals of the line finder and connector relays in the exchange (it being understood that bare wire multiples are used for connecting purposes in other portions of the exchange).

As more specifically shown in the copending applications, the relay equipment (such as illustrated at 20, Fig. 2 herein) is divided into groups and each group of relays is mounted on individual outwardly disposed strips which are in turn detachably mounted on the frame of the exchange bay. The terminals 52 of these relays are disposed in a vertical plane and extend rearwardly of the strip whereby interconnection of the relay terminals with other equipment in the exchange is facilitated. In the case of line finder and connector links, the terminals which lie in a horizontal plane are interconnected by a series of coplanar, bare wire, horizontally disposed multiple members, such as shown in Figures 1, 2 and 3.

These bare wire multiples 12 are mounted and supported in insulated spaced relation by cross bar conductor supports 14, which are apertured at equally spaced intervals, indicated at 16, the spacing in the present embodiment being approximately .062 inch. The supports 14 are formed of a suitable insulating material, such as Bakelite, and may be alternatively of a single section or multi-section construction. The present embodiment discloses an arrangement in which two individual strip sections 13 of Bakelite are clamped together by suitable fastening means, whereby a more readily demountable structure is provided.

The support members 14 are assembled on the bare wire multiples 12 at spaced intervals as determined by the width of the relay units 20 (Fig. 2), the supports being disposed adjacent both sides of the point of contact of the relay terminals 52 with the bare wire multiple 12. The positioning of the supports adjacent the point of connection of the relay terminals with the bare wire multiples effects the provision of a more rigid coplanar positioning of the members and prevents flexing thereof from the assigned plane of position.

Suitable holding means (not shown) at the end of each horizontal run of the multiples are used to prevent the horizontal displacement of the multiples responsive to application of pressure thereto in the interconnection of the relay terminals and the bare wire multiples.

The slidable wire guides 10 each comprise a base portion 22 having a pair of perpendicularly disposed parallel flanges 24 forming a receiving channel 26 at the one end thereof. Each pair of clamps 10, in their mounting on multiple wires 12, are mounted in back-to-back relation with the receiving channels 26 facing in opposed directions.

The flange portions 24 are transversely slotted at predetermined spaced intervals, as indicated at 28, the slots being located at intervals which are twice the normal spacing which exists between the adjacent ones of the multiple bare wire conductors 12. Thus, in the illustrated embodiment in which the spacing of the horizontal bare wire multiples, as determined by supports 14, is .0625, the spacing between the adjacent flange slots 28 will be .125 inch.

Figure 6:
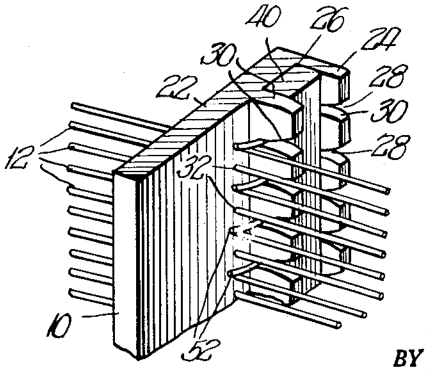
Figure 6 is a partial rear perspective view of a wedge lock in its operation to connect the relay and multiple members.

Each slot 28 is dimensioned to receive an assigned one of the rearwardly extending reed members 52 of a cooperating relay unit 20 (Fig. 2), the base of the slot 28 having a width of .025 inch and a base radius of .0125 to receive the reed members of the relay which are conventionally .020 inch in diameter. A leading edge 30 is provided for each slot which is angled at 60° from the major axis of the slot (as best illustrated in Figures 3 and 6), to facilitate entry of the assigned relay reed therein.

A series of apertures 32 are located on the base portion 22 immediately adjacent the base of the innermost one of the flanges 24 (Fig. 4), the apertures being disposed in a plane which is parallel with the plane of the flange members 24. Apertures 24 are spaced at intervals which are equivalent to the distance between the adjacent ones of the bare wire multiples 12, whereby each aperture 24 is arranged to support an assigned multiple member 12. In the illustrated embodiment, the bare wire multiples were spaced at .0625 inch and the apertures 32 are accordingly similarly spaced. Inasmuch as the slots 28 on the flanges 24 are located at intervals of .125 inch, alternate ones of the horizontal bare wire multiple 12 will be in alignment with corresponding slots 28 on the flanges 24.

The individual guides of each pair 10 are offset relative to each other whereby the alternate slots 28 of guide 1 of each clamp pair 10 is aligned with the even numbered ones of the bare wire multiples, and the alternate slots 28 of the other guide of each clamp pair 10 are aligned with the odd numbered ones of the bare wire multiple.

Figures 4, 5:
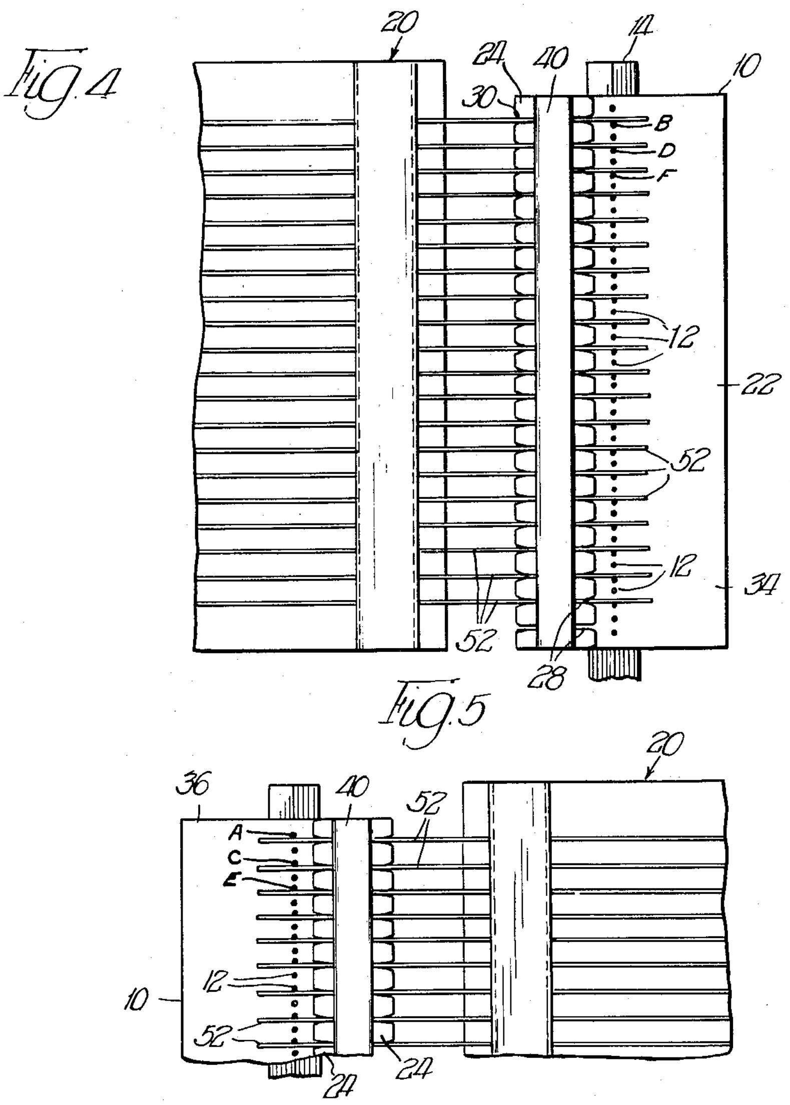
Figure 4 is a side plan view of one of a pair of multiple wedge lock guides in its operated position.
Figure 5 is a partial side plan view of a guide of the pair partially illustrated in Figure 4.

With reference to Figure 3, a pair of slidable clamps 10, illustrated as a left hand clamp 34 and the right hand clamp 36, are shown in their mounting on the bare wire multiple guide and as attached to the reed terminals 52 of a relay structure 20. With reference to the left hand guide 34 it is noted that each of the slots 28 is aligned with the even numbered ones of the multiples 12, and the slots of the right hand guide 36 are aligned with the odd numbered ones of the multiples 12. With reference to Figure 4, the left hand guide 34 is there shown in side elevation, and it is apparent from the identifying letters thereon that the alternate even numbered ones of the bare wire multiples labeled B, D and F are in approximate alignment with slots 28 on the flange 24 of the associate clamp 34. Figure 5 illustrates in side elevation the right hand guide 36 and the manner in which the odd numbered ones of the bare wire multiples identified by letters A, C, and E are in approximate alignment with slots 30 on the flange 24 of the associated clamp 36. Thus, each bare wire multiple 12 is aligned with a slot on one of the flanges of the clamp pair 10.

The offset of each pair of flanges 10 is accomplished by the provision of a number of apertures 32 which is one greater than the number of bare wire multiples 12. For example, if thirty bare wire multiples are required in the interconnection of the terminals of the relay 20, the slidable clamps will have thirty-one apertures. Thus, by mounting the first wire clamp 34 on the left hand side, with the first bare wire multiple 12 passing through the first aperture 32 thereof, and by mounting the second wire clamp 36 with the first bare wire multiple 12 passing through the second aperture thereof, the relative offset of the guides 34 and 36 is accomplished and the alignment of a slot with each bare wire multiple 12 is thereby effected.

Each of the slots 28 of the clamp pair 10, in addition to being aligned with one of the bare wire multiples, are also aligned with an assigned relay terminal 52 and effective in their operation to complete a pressure contact between the rearwardly extending terminals 52 of the telephone relays 20 in the exchange and the horizontally extending bare wire multiples 12.

With reference now to Figure 2 of the drawings herein, the rearward portion of one of the relays 20, used in conventional all relay exchanges, is shown somewhat schematically to indicate the manner of interconnection of the reeds 52 thereof, with the bare wire multiples 12.

With reference to Figure 1, the mounting of the pairs of lock clamping guides 10 on the bare wire multiples 12 is shown thereat, the respective members of each pair 10 being offset relative to each other by the distance between one pair of adjacent bare wire multiples 12. Preparatory to mounting a relay bearing strip in the exchange the slidable wire clamps are positioned in back-to-back relation at the central point of their operating limits (as determined by the cross bar supports 14) to facilitate the mounting of the relay strip members to the exchange frame. As the strip is brought into position, the rearwardly extending reeds 52, as illustrated in Figure 2, of the relays 20 will be inserted between corresponding ones of the bare wire multiples 12. As shown in Figure 3, the left hand relay terminals 52 will be adjacent the odd numbered ones of the bare wire multiples 12 and the right hand relay terminals 52 will be adjacent the even numbered ones of the bare wire multiples 12.

The wire clamps 10 are then moved outwardly of their centralized position to bring the slots 28 thereon into engagement with the rearward portion of the relay reeds 52, the clamps 34 and 36 receiving the reed molding 40 on the relay terminals 52 within the confines of the channel 26. The reeds 52 are urged into the corresponding slot 28 on the flanges 24 by the leading angled edge 30 thereon. As the clamping guides 34 and 36 are moved along the multiples 12 in proximity to the beaded molding 40, the wedge portion 30 of the slots 28 contacts the rearwardly protruding portions of the wire reeds 52 to encourage the movement of the reeds 52 into firmer engagement with the adjacent ones of the multiples 12, as well as into the flat or locking portion of the slots 28. Since the bare wire multiples 12 are in alignment with the slots 30, and the wire reeds are now being moved into the slots 30, a dimensional interference will occur between the horizontal bare wire multiples 12 and the rearwardly extending relay terminals 52. As further pressure is applied to the clamps 34 and 36, each of the relay terminals 52 is firmly fixed in a clamp-like grip by the two coplanar flange slots 28 associated with each of the terminals 52, and the portion of the relay terminal reed 52 which extends beyond the flange slots 28 is flexed slightly by reason of the pressure applied thereto, this pressure being in the order of 100 tons per square inch. As the clamps are moved into final position, as shown in Figures 2 and 3, with the reed molding 40 firmly entrenched within the channel 26 of the corresponding clamp, the flat locking portion of the slots 28 continue the application of pressure of each of the contacting members 52 and 12, and a firm reliable contact between the bare wire multiples 12 and relay terminal reeds 52 is effected.

The manner in which the reeds 52 are flexed at their outward end is specifically shown in Figure 6, there being also a slight flexing of the horizontal bare wire multiples as indicated thereat. It is the live locking action between the multiples 12 and relay terminal wires 52 as maintained therebetween by the locking clamp pair 10 which accomplishes the positive and reliable type of contact which is essential to the provision of a demountable type all relay telephone exchange system.

To insure the full effect of the wedgelock principle, and to insure the maximum pressure contact between the multiples 12 and reeds 52, a tool is provided to move the clamping guides 10 into wedging engagement with the reeds 52. The tool comprises a pair of main arms pivotally connected intermediate their ends. At adjacent ends, the arms are provided with hand grips and at the opposite ends are each provided with a toolhead. Each toolhead comprises a crossarm extending transversely of the arm with which it is associated and a plurality of legs or projections extending therefrom in the direction of the main arm. The leg or projections of one toolhead present flat work engaging faces and the legs or projections on the other toolhead are L-shaped so as to present a working face of limited extent positioned in opposition to the working face of the legs of the first toolhead. The crossarm of the toolhead having the L-shaped legs is preferably of a length in excess of the distance between the end wires of a bare wire multiple, such as that shown in Figure 1. This last described crossarm is provided at each end with a leg or projection of L-shape as described hereinbefore. Intermediate the end legs, the crossarm is provided with a number of L-shaped legs of a very narrow width which are adapted to be received between adjacent wires of the bare wire multiples. The other toolhead may be of any desired length and the legs thereof are preferably aligned with the L-shaped legs on the elongated crosshead so as to be received between the same wires of the bare wire multiples as the intermediate L-shaped legs of the elongate toolhead.

In operation, the tool is grasped in the operator's hand and is moved toward the bare wire multiples, which have previously been loosely associated with the relay by hand, and the elongate tool head is so positioned with respect to the bare wire multiples 12 that the end legs of the crosshead straddle the bare wire multiples and the intermediate legs enter between adjacent wires of the multiples. The tool is so positioned as to straddle one of the clamping guides, with the toolhead having the L-shaped legs being positioned on the same side of the guide as the flanges 24. The other toolhead is positioned on the opposite side of the clamping guide and the legs thereof extend between the same wires 12 as the intermediate legs on the elongate toolhead. Each guide 10 is clamped to its associated series of relay reeds individually. As the handles of the tool are moved toward one another, the toolheads thereof are moved toward one another and the working face of the L-shaped legs are moved into engagement with the molding 40 fixedly secured to the relay terminals 52. The other head of the tool engages the flat or non-flanged side of the clamping guide. Continued movement of the handles of the tool toward one another forces the clamping guide onto the relay reeds 52, with the molding 40 of the relay reeds being received within the groove or chamber 26 between the flanges 24 on the clamping guide 10. As the tool is utilized to force the reeds 52 into the slots 28 in the flange, the reeds 52 are acted upon by the wedging surface 30 of each slot to effect high pressure contact between the reeds 52 and the bare wire multiples 12, as described hereinbefore.

In an operating installation, the relay reeds 52 project horizontally from the rear of a bay. To secure a bare wire multiple to a series of relay reeds, a bare wire multiple, formed as shown in Figure 1, is moved onto the reeds 52, with each pair of guides 10 being received between adjacent series or rows of relay reeds. As will be apparent from Figure 3, the bare wire multiples 12 will be supported by the reeds 52 and the guides 10 may be each moved manually toward the series or row of reeds with which it is to be associated. After all of the guides have been positioned adjacent a row of reeds, as stated, the tool is utilized to clamp each of the guides to the associated row of reeds, as described hereinbefore. Assuming an installation in which three relays are provided, a bare wire multiple will be formed exactly as shown in Figure 1, with three pairs of clamping guides. To operatively associate the bare wire multiples with the three relays, the operator manually positions the bare wire multiple on the relays, manually moves the clamping guides 10 toward the associated row or series of relay reeds and the tool is utilized in six separate operations to operatively secure the clamping guides 10 to their associated row of relay reeds. It will be apparent that these few operations can be accomplished in a very short time and with very little physical effort, the tool facilitating the assembly.

To remove a bare wire multiple from the relay reeds with which it has been associated, it is merely necessary to apply the tool described to the upstanding portions of adjacent guides 10 and moving the tool heads toward one another to cause disassociation of each guide 10 with its associated series of relay reeds. Accordingly, it will be appreciated that the present invention provides a readily assembled and disassembled structure for effecting operative contact between the reeds of a plurality of relays and a bare wire multiple, the pressure contact between the reeds and the wires being such as to positively insure effective electrical contact therebetween.

In the preferred construction, the various elements, such as the supports 14, the guides 10 and the moldings 40, are formed of Bakelite, since Bakelite, a thermo-setting material, once molded is not effected by extreme conditions of temperature and moisture. The absence of distortion of molded Bakelite under extreme pressure renders it ideally suited for use in the wedge lock multiple assembly.

While we have described a preferred embodiment of our invention, it will be apparent that various modifications, changes and rearrangements may be made without departing from the scope of the present invention, as defined by the appended claims.

We claim:

1. Apparatus for effecting operative contact between a pair of electric conductors, the conductors being angularly disposed with respect to each other and lightly engaging each other, comprising a member slidably supported by one of the conductors and presenting a wedging surface arranged to engage the other of the conductors, said wedging surface being disposed to move the conductors toward one another, said member being adapted to be moved along the one conductor to bring said wedging surface into engagement with the other conductor to force the conductors toward a common plane.

2. Apparatus for effecting operative contact between a pair of electric conductors, the conductors being disposed with their axes in angular relation with respect to each other and lightly engaging each other, comprising a member slidably mounted on one of the conductors and presenting a wedging surface arranged to engage the other of the conductors, said wedging surface being disposed to move the conductors toward one another, said member being mounted for movement along the one conductor to bring said wedging surface into engagement with the other conductor to force the conductors from their normal positions and toward a common plane, said member presenting a locking surface leading from said wedging surface whereby said conductors are locked in their new positions under pressure.

3. A member for effecting contact between a first wire and a second wire angularly disposed with respect to the first wire and lightly engaging the first wire, said member being slidably mounted on the first wire and having an open-ended slot for reception of the second wire, said slot being defined by a pair of inclined surfaces at its open end and a flat surface leading from each of said inclined surfaces, said slot being normally aligned with the first wire and being adapted to be moved into engagement with the second wire, the second wire being engaged by one of said inclined surfaces as said member is moved toward the second wire, whereby each wire is wedged toward the normal plane of the other wire to effect pressure contact therebetween, the second wire being engaged by the flat surface of said slot leading from the inclined surface moved into engagement with the second wire after the completion of the wedging action to lock the wires in pressure contact.

4. A member for effecting contact between a first wire and a second wire angularly disposed with respect to the first wire and lightly engaging the first wire, said member being slidably mounted on the first wire and having an open-ended slot for reception of the second wire, the second wire being anchored and said member being movable with respect thereto, said slot being defined by a pair of inclined surfaces at its open end and a flat surface leading from each of said inclined surfaces, said slot being normally aligned with the first wire, and said member being adapted to be moved into engagement with the second wire, the second wire being engaged by one of said inclined surfaces as said member is moved toward the second wire, whereby said member and the first wire are moved with respect to the second wire to wedge the first wire into the normal plane of the second wire to effect pressure contact therebetween, the second wire being engaged by the flat surface of said slot leading from the inclined surface which flat surface was moved into engagement with the second wire after the completion of the wedging action to lock the wires in pressure contact.

5. In telephone apparatus, a first series of parallel wires, a second series of parallel wires angularly disposed with respect to said first series of wires and lightly engaging said first series of wires, a guide slidably mounted on said second series of wires, said guide having a plurality of slots therein, said slots being each adapted to receive one wire of said first series of wires and each being aligned with one wire of said second series of wires, said slots each presenting a wedging surface, said guide being adapted to be moved with respect to said first series of wires to bring the wedging surface of each of said slots into engagement with a corresponding wire of said first series of wires, whereby with further movement of said guide the wires of said second series of wires with which said slots are normally aligned and the wires of said first series now engaged by said slots are forced toward a common plane by said wedge member.

6. In telephone apparatus, a first series of parallel wires, a second series of parallel resilient wires angularly disposed with respect to said first series of wires and lightly engaging said first series of wires, a guide slidably mounted on said second series of wires, said guide having a plurality of slots therein, said slots being each adatped to receive one wire of said first series of wires, said first series of wires and said second series of wires being firmly supported relative to said guide, said slots being each aligned with one wire of said second series of wires and each presenting a wedging surface and a locking surface leading from said wedging surface to its corresponding wire in said first series, said guide being adapted to be moved with respect to said first series of wires to bring the wedging surface of each of said slots into engagement with one wire of said first series of wires, whereby the wires of said second series of wires with which said slots are normally aligned and the wires of said first series engaged by said slots are each forced toward a common plane, said locking surface of each of said slots being thereafter movable into engagement with the wire of said first series of wires engaged by the wedging surface of the respective slot to lock the corresponding wires of the two series together.

7. In telephone apparatus, a plurality of spaced parallel wire reeds, a guide having a flange thereon, said flange having a plurality of spaced parallel slots therein, the spacing between said slots being equal to the spacing between said wire reeds, said slots each being of a size to conformably receive one of said wire reeds, said slots being defined by an entering wedge surface and a lock surface, said guide being adapted to be associated with said reeds by movement toward said wire reeds transversely thereof whereby said wire reeds are received in said slots, and a plurality of wires carried by said guide, said wires being normally aligned with said slots in said flange and extending transversely of said wire reeds, whereby, when said guide and said wires are moved toward operative association with said wire reeds, said wire reeds and said wires offer dimensional interference which originally effects an offset of said slots with respect to said wire reeds causing said wire reeds to engage the entering wedge surface of said slots as said guide is moved into engagement with said wire reeds so that said guide must be wedged onto said wire reeds for said wire reeds to be received in said slots, the wedging action forcing said wire reeds and said wires into intimate and high pressure engagement due to the dimensional interference therebetween.

8. In telephone apparatus, a plurality of spaced parallel wire reeds, a molding fixedly associated with said wire reeds and extending transversely thereof, a guide having a pair of spaced flanges thereon, each of said flanges having a plurality of spaced parallel slots therein, the spacing between said slots being equal to the spacing between said wire reeds, said slots each being of a size to conformably receive one of said wire reeds, said slots being defined by an entering wedge surface and a lock surface, said guide being adapted to be associated with said wire reeds by movement toward said wire reeds transversely thereof whereby said wire reeds are received in said slots, said flanges being spaced apart for the reception therebetween of said molding when said wire reeds are received in said slots, and a plurality of wires carried by said guide, said wires being normally aligned with said slots in said flanges and extending transversely of said wire reeds, whereby, when said guide and said wires are moved toward operative association with said wire reeds and said molding, said wire reeds and said wires have dimensional interference which originally effects an offset of said slots with respect to said wire reeds causing said wire reeds to engage the entering wedge surface of said slots as said guide is moved into engagement with said wire reeds so that said guide must be wedged onto said wire reeds for said wire reeds to be received in said slots, the wedging action forcing said wire reeds and said wires into intimate and high pressure engagement due to the dimensional interference therebetween.

9. In telephone apparatus, a plurality of spaced parallel wire reeds, a molding fixedly associated with said reeds and extending transversely thereof, a guide having a pair of spaced flanges thereon, each of said flanges having a plurality of spaced parallel slots therein, the spacing between said slots being equal to the spacing between said wire reeds, said slots each being of a size to conformably receive one of said wire reeds and being defined by an entering wedge surface and a lock surface, said guide being adapted to be associated with said wire reeds by movement toward said wire reeds transversely thereof whereby said wire reeds are received in said slots, said flanges being spaced apart for the reception therebetween of said molding when said wire reeds are received in said slots, and a plurality of wires carried by said guide, said wires being normally aligned with said slots in said flanges and extending transversely of said wire reeds, whereby, when said guide and said wires are moved toward operative association with said wire reeds and said molding, said wire reeds and said wires have dimensional interference which originally effects an offset of said slots with respect to said wire reeds causing said wire reeds to engage the entering wedge surface of said slots as said guide is moved into engagement with said wire reeds so that said guide must be wedged onto said wire reeds for said wire reeds to be received in said slots, the wedging action forcing said wire reeds and said wires into intimate and high pressure engagement due to the dimensional interference therebetween, the locking surface of said slots leading from the wedging surface thereof and being engaged by said wire reeds after said wire reeds have been wedged into contact with said wires to lock said wire reeds and wires in pressure contact.

10. In telephone apparatus a relay having two contact banks each of which is comprised of a plurality of evenly spaced parallel wire reeds, the individual reeds of one bank being offset relative to the individual reeds of the other bank, a bare wire multiple adapted to be operatively associated with the terminal end of said wire reeds including a plurality of evenly spaced parallel wires, the spacing between the wires being one-half the spacing between adjacent ones of said wire reeds, the wires being positioned so that with the relative offset of the wire reed terminals of the two banks every other wire of said multiple is positioned adjacent the reed terminals of one of said banks, and the alternate wires thereof are positioned adjacent the wire reed terminals of the other of said banks; a first and a second wire guide having a plurality of apertures therein for the reception of the wires of said multiple and the slidable mounting of the guides thereon, and a flange on each of said guides having a plurality of parallel slots thereon spaced at intervals equal to the spacing between adjacent ones of the wire reed terminals, said wire guides being mounted in back-to-back relation with their flanges extending in opposite directions and with one guide receiving the first wire of said multiple in its first aperture and the other guide receiving the first wire of said bare wire multiple in its second aperture, whereby said guides are offset with respect to each other and the slots of said first wire guide are operative to engage the terminals of said first bank and the slots of said second wire guide are operative to engage the terminals of said second bank, each of said slots in said flanges being defined by an inclined wedge surface which is operative with movement of its corresponding guide toward its associated bank of terminals to urge the alternate wires associated with the guide into contact with the reed terminals engaged thereby to effect pressure contact therebetween.

11. In telephone apparatus according to claim 10, each of said slots including a flat locking surface leading from said wedge surface, whereby said wires and said reeds are locked in wedged position after said wire guides have been moved to effect complete wedging with respect to each series of reed terminals.

12. A connector for a pair of wires which are supported only at intermediate points and in angularly disposed relation relative to each other, comprising means for holding a free portion of one of the wires, said means including a non-resilient wedging surface for engaging the other of said wires and moving same under pressure against the first wire adjacent said holding point.

13. A connector for a pair of wires which are supported only at intermediate points and in angularly disposed relation with respect to each other, comprising means for holding one of said wires at an unsupported point along its length, and non-resilient wedging means for moving the other one of said wires toward the first wire adjacent said holding point with sufficient force to flex each of said wires slightly and urge same toward a common plane.

14. In an electrical apparatus, a pair of wires angularly disposed with respect to each other, and a unitary connector member for effecting a pressure connection therebetween including a supporting portion for one wire, and a non-resilient wedging surface for engaging the other wire to move same under pressure against the other of said wires adjacent said supported position to thereby effect a firm contact therebetween.

15. In an electrical apparatus, a first wire and a second wire, means for supporting said wires only at intermediate points along their length with the axis of said wires being normal to each other, and connector means for effecting a pressure connection therebetween including an apertured position for journalling one of said wires, and a wedging surface for engaging the other wire to move same under pressure against the one wire adjacent the journalled section thereof to effect a firm contact therebetween.

References Cited in the file of this patent

UNITED STATES PATENTS

| | | |
|---|---|---|
| 516,291 | Aylworth et al. | Mar. 13, 1894 |
| 1,267,959 | Becker | May 28, 1918 |
| 1,541,343 | Goff | June 9, 1925 |
| 1,553,313 | Goff | Sept. 15, 1925 |
| 2,107,835 | Pierce | Feb. 8, 1938 |
| 2,530,354 | Hayslett | Nov. 14, 1950 |